March 10, 1970 W. H. PUST 3,499,495
CROP SEED PLANTING DEVICE
Filed March 29, 1968

INVENTOR.
WALDO PUST,
BY
Berman, Davidson & Berman
ATTORNEYS.

United States Patent Office 3,499,495
Patented Mar. 10, 1970

3,499,495
CROP SEED PLANTING DEVICE
Waldo H. Pust, Savage, Mont. 59262
Continuation-in-part of application Ser. No. 621,391,
Feb. 17, 1967. This application Mar. 29, 1968, Ser.
No. 717,473
Int. Cl. A01c 5/06; A01b 21/08, 15/16
U.S. Cl. 172—536                                    6 Claims

ABSTRACT OF THE DISCLOSURE

This invention relates to a means of forming seed rows while holding the ground from being carried away from opposite sides of the furrow. Furrow forming discs form the furrows and are inclined downwardly and upwardly from substantially the point of entry into the ground. Scraping wheels are mounted on axes offset from the disc axes and engage the ground adjacent the points where the scraping wheels leave the surface of the ground. The scraping wheels serve the double purpose of scraping dirt from the discs, and holding the dirt in position on opposite sides of the furrow.

---

This is a continuation-in-part of my application for patent, Ser. No. 621,391, filed Feb. 17, 1967, now abandoned, for Crop Seed Planting Device.

This invention relates an apparatus for planting seed crops in rows, and deals particularly with a device for planting the seeds uniformly beneath the surface of the ground with the least possible disturbance to the soil around the seed.

The objective of all planting of seed of any sort is to secure quick and uniform germination throughout the field. Moisture in the soil, of course, is essential to quick and uniform germination but in most soils planting equipment of this general type will not function effectively if the soil is truly wet. On the other hand, if the surface is dry but the soil is moist, say from one-half inch to several inches below the surface, conventional planting equipment has encountered considerable difficulty in that there is too much disturbance of the soil in the seed row which causes rapid drying of the soil and uneven burial of the seed with the result that the seeds do not all germinate without additional moisture. So serious is this problem, that for some crops it has become the practice to wait until the soil is thoroughly dried to a depth of several inches, then to perform the planting operation and thereupon to irrigate in order to bring about early germination on a uniform basis.

There is almost a universal desire on the part of farmers to plant any crop as early as the nature of the crop and the particular climate will permit and indeed the period within which any crop may be planted is relatively short if optimum results are to be obtained. The present invention makes it possible to seize the earliest opportunity, when the surface of the soil is efficiently dry to permit the planting apparatus to operate and while there is still moisture sufficiently near the surface to allow for quick and uniform germination, to place the seed in the seedbed.

The prime feature of the present invention resides in the provision of a device of the type described in which scraper wheels are supported outwardly of the discs on axes parallel to, but spaced from the axes of the discs. The scraper wheels are preferably in surface contact with the outer surfaces of the discs, and serve the double purpose of compacting the ground outwardly of the discs near the point where the discs leave the surface of the ground, and also as a means of scraping the dirt from the discs as the discs leave the ground, thereby causing a minimum of disturbance to the ground outwardly from the discs, and preventing the earth from being torn up outwardly from the ground, there is a tendency for the dirt to adhere to the outer surfaces of the discs and to be carried upwardly thereby. Scraper blades often are provided to engage the outer surfaces of the discs and to strip the moist dirt from the discs. The dirt scraped from the discs however drops downwardly from the scraper blades leaving a furrow which tends to be ragged and poorly formed. When scraper wheels are used thereby removing the moist earth from the discs closely adjacent to the point where the discs leave the ground, much of this difficulty is eliminated.

It is the overall object of the present invention to provide a device of the type described in which the scraper wheels ride upon the surface of the earth at the points of departure of the discs from the ground, and thus serve the dual purpose of cleaning the discs and of keeping the soil virtually undisturbed. As a result, the earth is compacted uniformly on opposite sides of the furrow, simplifying the uniform covering on the furrows.

A further feature of the present invention resides in the provision of a device of the type described in which the discs are supported on axes slightly spaced from the axes of the scraper wheels, providing a relative movement between the surfaces of the wheels and the surfaces of the discs, irrespective of whether the scraper wheels are of greater or lesser diameter than the discs or are the same diameter as the discs.

These and other objects and novel features of the present invention will be more clearly and fully set forth in the following specification and claims.

In the drawings forming a part of the specification:

Figure 1:
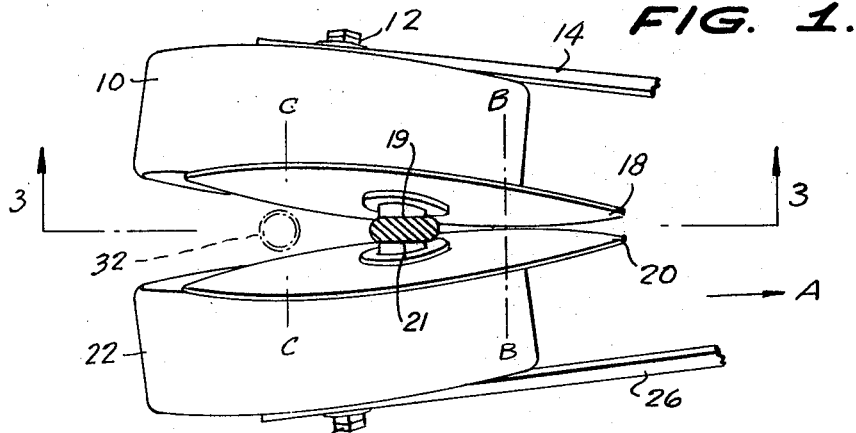
FIGURE 1 is a top plan view of the crop seed planting device.

In view of the fact that the novelty of the present invention resides in the arrangement of the discs and the scraper wheels, these elements have been shown in detail in this present invention and the auxiliary equipment which is used in conjunction with the apparatus has been eliminated from the drawings or at least not shown in detail. It will be understood that the device is normally drawn by a tractor and is used in conjunction with a seeder normally embodying a seed bin and possibly a fertilizer bin, with means for delivering seeds and fertilizer when fertilizer is used. The complete apparatus also includes some type of plow or blade structure which follows the seeder and acts to cover the seed in the furrow. Such devices also often include a compacting wheel which moves over the ground above the closed furrow to press the earth firmly in place above the seed. Devices of this type are well known in the art, and accordingly, this structure has not been shown in the drawings.

In general, the seeder includes a pair of longitudinally extending arms, each of which adjustably supports a scraper wheel. A pair of furrow forming discs are supported by a vertical member on the seeder, the discs being located between the scraper wheels. The manner in which the vertical support and the wheel supporting arms are mounted upon the seeder is not illustrated.

An earth scraper wheel 10 having a generally cylindrical outer surface is pivotally supported by a pivot vertical member on the seeder, the discs being located between the scraper wheels. The manner in which the vertical support and the wheel supporting arms are mounted upon the seeder is not illustrated.

An earth scraper wheel 10 having a generally cylindrical outer surface is pivotally supported by a pivot 12 mounted upon one of the supporting arms 14. A vertical supporting arm 16 supports a pair of furrow forming discs 18 and 20. A scraper wheel 22 which is of similar diameter and form to the scraper wheel 10 is mounted upon a pivot shaft 24 adjustably supported by the second supporting arm 26. This general arrangement is illustrated in FIGURE 1 of the drawings.

In the arrangement illustrated, the discs 18 and 20 are substantially flat furrow forming discs. However, it should be noted that concave discs which are often used for forming furrows, could similarly be used. The discs 18 and 20 are supported by pivots 19 and 21, the axes of which are angularly related. The axes 19 and 21 preferably intersect at the center of the vertical support 16.

The letter B indicated in the drawings designates a broken line extending through the discs at the intersection between the discs and the earth which is indicated in general by the letter D. A second line is indicated at C, this line extending transversely of the direction of travel of the discs and showing the points of departure of the discs from the ground D. The furrow 30 is formed in the earth between the lines B and C.

As is indicated in FIGURE 1 of the drawings, the axes 19 and 21 of the discs 18 and 20 are angled so that the discs 18 and 20 contact or substantially contact at the line B where the discs enter the ground. As will be understood, the discs 18 and 20 are spread apart to the greatest extent in diametrically opposed relation to the line B. As is evident from FIGURE 1, the portions of the discs are spaced apart approximately the width of the furrow 30 at the points C where the discs leave contact with the ground.

The wheels 22 are adjustably supported by the arms 14 and 26 so that the center of each wheel may be varied relative to the center of the corresponding disc. In view of the fact that both wheels are similarly supported, both adjustably supports are not illustrated in the drawings.

Figure 2:
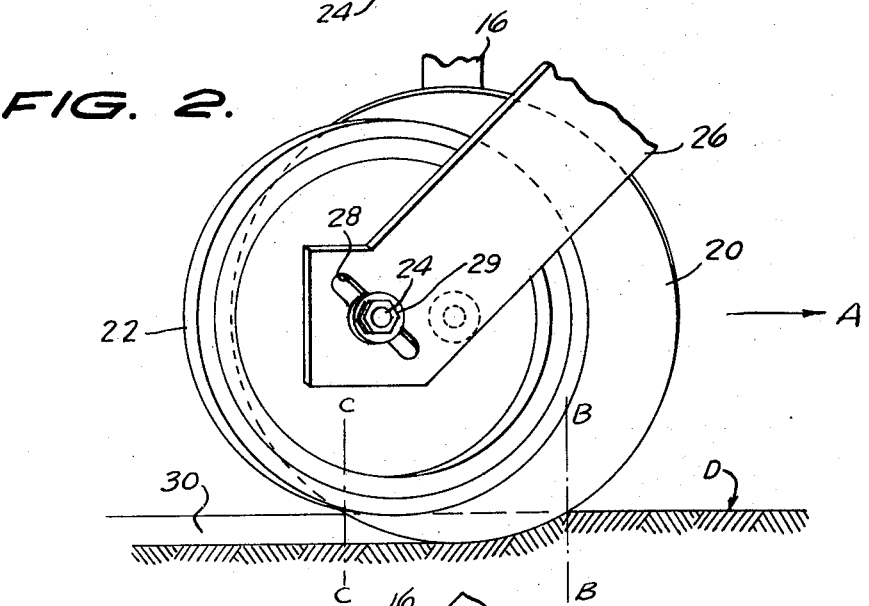
FIGURE 2 is a side elevational view of the structure shown in FIGURE 1.
Figure 3:
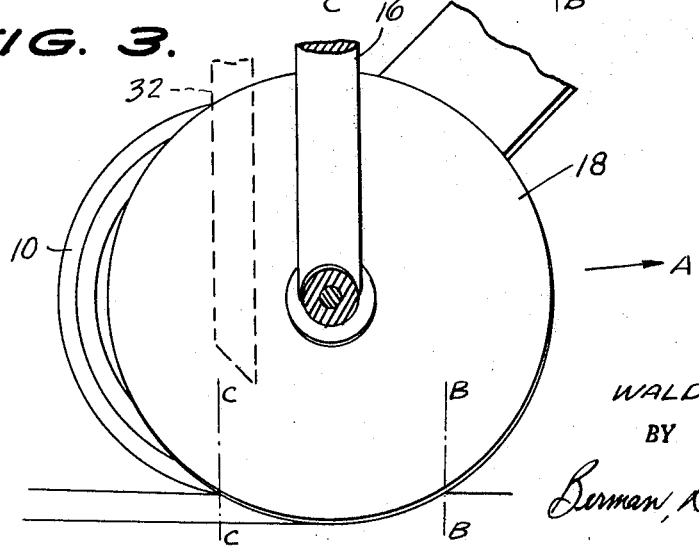
FIGURE 3 is a sectional view upon the line 3—3 of FIGURE 1.

As shown in FIGURE 2, the arm 26 is provided with an inclined slot 28 through which the pivot 24 extends, the pivot being held in an adjusted position by means of a clamping nut 29. The slot 28, as well as the similar slot in the arm 14 through which the pivot 12 extends, inclines forwardly and downwardly with respect to the direction of travel of the device. In the particular arrangement illustrated, with the discs and wheels proportioned in the manner shown, the slot 28 is directed generally toward the line B or at the point at which the two discs enter the ground. By adjusting the pivot axis 12 and 24 downwardly and forwardly from the position shown in FIGURE 2, the depth to which the discs 18 and 20 will enter the ground will be reduced. Similarly, by adjusting the pivots 12 and 24 upwardly and to the left, the depth to which the discs will enter the ground is increased. By adjustably locating the pivot shafts 12 and 24 in inclined slots in the manner illustrated, the lowest points of the wheels 10 and 22 will be between the lines B and C, and will be close to the line C. As a result, the lowest portion of the wheel will engage the ground at a point closely adjacent to where the discs leave the ground. As a result, any dirt adhering to the outer surface of either disc will be removed by the contacting wheel before the dirt is lifted from the surface of the ground. The wheels thus compact the dirt outwardly of the discs which tends to prevent the dirt from clinging to the discs and at the same time scrapes the dirt from the discs as the disc leaves the ground thereby maintaining furrows of equal width regardless of the moisture content of the earth.

The numeral 32 indicates a seed feeding spout which extends between the discs and acts to drop the seed into the furrow. The precise location of this spout will be determined by the nature of the seed being planted, and is shown in the drawings purely for the purpose of clarification.

An arrangement in which the rims of the discs 18 and 20 converge in the direction of the arrow A is not particularly uncommon. However, in the present device there is a further divergence of the disc in a vertical direction as may be noted from FIGURE 1. As the axes of the scraper wheels 10 and 12 are parallel to the axes of the discs, this arrangement has the effect of canting the relatively flat peripheral surfaces of the wheels 10 and 12 and greatly aids in compacting the soil adjacent the furrow 30. As a result, the furrow is uniform at the time the seeds are dropped permitting a more effective and uniform germination of the seeds.

While the present device is originally developed in conjunction with the planting of sugar beets seeds it would be equally effective in the planting of other row crops such as corn and soy beans etc. It is also believed effective with various other types of small grain and the like.

I claim:
1. An apparatus for forming seed planting furrows comprising:
   a pair of furrow forming discs,
   means rotatably supporting said discs on intersecting axes with the peripheries of said discs substantially contacting at their point of entry into the ground and diverging apart rearwardly and upwardly relative to the direction of travel,
   a pair of depth gage compacting wheels in face contact with the outer surfaces of said discs,
   means supporting said wheels on axes parallel to, and spaced rearwardly from, the axes of said discs, and the radius of the wheels exceeding the distance from the axis of the wheels to the rear edges of the discs and being less than the radius of the discs,
   said wheels extending beyond the peripheries of the discs which they contact rearwardly of the axes of said wheels relative to the direction of travel.
2. The structure of claim 1 and in which the lowermost portion of each said wheel is adapted to be in contact with the ground closely adjacent to the point where the disc leaves the ground.
3. The structure of claim 1 and in which said wheels are supported by means independent of said disc supporting means.
4. The structure of claim 1 and in which said wheel supporting means are positioned outwardly of said wheels.
5. The structure of claim 1 and in which said wheel supporting means is adjustable.
6. The structure of claim 1 and in which said wheel supporting means is adjustable in a direction upwardly and rearwardly, or downwardly and forwardly relative to the direction of travel.

References Cited

UNITED STATES PATENTS

| 1,286,268 | 12/1918 | Fifield | 172—575 |
| 1,851,597 | 3/1932 | Siems | 172—575 |
| 2,332,012 | 10/1943 | Rasmussen | 172—536 |
| 2,685,243 | 8/1954 | Cole | 172—536 |

ROBERT E. PULFREY, Primary Examiner

J. W. PETERSON, Assistant Examiner

U.S. Cl. X.R.

172—558, 575